(12) United States Patent
Kokufu et al.

(10) Patent No.: US 8,405,713 B2
(45) Date of Patent: Mar. 26, 2013

(54) IMAGE PICKUP APPARATUS AND IMAGE COMBINING METHOD OF IMAGE PICKUP APPARATUS

(75) Inventors: Tetsuya Kokufu, Machida (JP); Yoji Watanabe, Fuchu (JP)

(73) Assignee: Olympus Imaging Corp., Tokyo (JP)

( * ) Notice: Subject to any disclaimer, the term of this patent is extended or adjusted under 35 U.S.C. 154(b) by 953 days.

(21) Appl. No.: 12/402,894

(22) Filed: Mar. 12, 2009

(65) Prior Publication Data

US 2009/0231420 A1 Sep. 17, 2009

(30) Foreign Application Priority Data

Mar. 14, 2008 (JP) ................................. 2008-066004

(51) Int. Cl.
*H04N 9/47* (2006.01)
*G06K 9/36* (2006.01)
(52) U.S. Cl. .......................... 348/78; 382/284
(58) Field of Classification Search .............. 348/61, 348/77–78; 382/276, 284
See application file for complete search history.

(56) References Cited

U.S. PATENT DOCUMENTS

| | | | | |
|---|---|---|---|---|
| 6,226,013 | B1* | 5/2001 | Murata et al. .............. | 345/634 |
| 7,683,950 | B2* | 3/2010 | Kelly et al. ................. | 348/252 |
| 2003/0123725 | A1* | 7/2003 | Narusawa .................... | 382/166 |
| 2005/0105822 | A1* | 5/2005 | Narita ........................ | 382/275 |
| 2005/0129287 | A1* | 6/2005 | Enomoto ...................... | 382/117 |
| 2005/0232490 | A1* | 10/2005 | Itagaki et al. ................ | 382/190 |
| 2007/0201750 | A1* | 8/2007 | Ito et al. ..................... | 382/228 |
| 2007/0237421 | A1* | 10/2007 | Luo et al. .................... | 382/284 |
| 2008/0074441 | A1* | 3/2008 | Chujo et al. ................. | 345/634 |
| 2008/0239086 | A1* | 10/2008 | Nakamura ................... | 348/222.1 |
| 2008/0240489 | A1* | 10/2008 | Marugame .................... | 382/100 |
| 2008/0267443 | A1* | 10/2008 | Aarabi ....................... | 382/100 |

FOREIGN PATENT DOCUMENTS

| | | |
|---|---|---|
| JP | 2005-122287 | 5/2005 |
| JP | 2005-222152 | 8/2005 |
| JP | 2006-040232 | 2/2006 |
| JP | 2006-053718 | 2/2006 |
| JP | 2006-072742 | 3/2006 |

OTHER PUBLICATIONS

Translation of Japanese Patent Publication No. 2006-040232, Feb. 9, 2006.*
Notice of Rejection for Japanese Patent Application No. 2008-066004, mailed Mar. 13, 2012 (2 pgs.) with translation (3 pgs.).
Decision of a Patent Grant for Japanese Patent Application No. 2008-066004, mailed May 29, 2012 (2 pgs.) with translation (2 pgs.).

\* cited by examiner

*Primary Examiner* — Joshua Joo
(74) *Attorney, Agent, or Firm* — John C. Pokotylo; Straub & Pokotylo

(57) ABSTRACT

In an image pickup apparatus, an original image selecting unit selects an original image from picked-up images acquired by an image pickup unit; a process image selecting unit selects a process image from the picked-up images; and an image combining instructing unit issues an instruction to combine the process image with the original image; an eye detecting unit detects an eye area. Further, a combining position setting unit sets a combining position in the original image based on a position of the eye area; an image processing unit processes the process image; an image combining unit combines the processed process image with the original image in the combining position, and generates a composite image; and a composite image display control unit performs control such that the composite image is displayed on a display unit.

9 Claims, 15 Drawing Sheets

FRONT FACE

SIDE FACE
(LEFT)

IMAGE PICKUP APPARATUS AND IMAGE COMBINING METHOD OF IMAGE PICKUP APPARATUS

CROSS-REFERENCE TO RELATED APPLICATIONS

This application is based upon and claims the benefit of priority from Japanese Patent Application No. 2008-066004, filed Mar. 14, 2008, the entire contents of which are incorporated herein by reference.

BACKGROUND OF THE INVENTION

1. Field of the Invention

The present invention relates to an image pickup apparatus including an image pickup unit that picks up an image of a subject, and to an image combining method performed by the image pickup apparatus.

2. Description of the Related Art

As a method of picking up a portrait image, a catch light method using catch lights during photographing is known. In the catch light method, a light source is used, a light is applied to a subject with, for example, a light source during photographing, and the light is reflected from the eyes of the subject, which leads to an attractive face. However, because the catch light method requires a light source as well as proficiency of a photographer, it cannot be used carried out. As a technology to deal with the above inconvenience, a technology in which eye areas in an image are detected and the areas are processed is known. For example, Japanese Patent Application Laid-open No. 2006-53718 discloses a technology in which a catch light is generated in a portion of a pupil in an eye area of an image by adding thereto a decoration pattern.

SUMMARY OF THE INVENTION

An image pickup apparatus according to an aspect of the present invention includes an image pickup unit that picks up images to acquire picked-up images; an original image selecting unit that selects, as an original image, a picked-up image of a subject including a face from the picked-up images acquired by the image pickup unit; a process image selecting unit that selects, as a process image, a picked-up image to be combined with the original image from the picked-up images acquired by the image pickup unit; an image combining instructing unit that issues an instruction to combine the process image with the original image; an eye detecting unit that detects a face area from the original image, and detects an eye area based on a result of detecting the face area; a combining position setting unit that sets a combining position in the original image based on a position of the eye area detected by the eye detecting unit; an image processing unit that processes the process image; an image combining unit that combines the process image processed by the image processing unit with the original image in the combining position in the original image, and generates a composite image; an image display unit that display the composite image; and a composite image display control unit that performs control such that the composite image is displayed on the image display unit.

An image combining method according to another aspect of the present invention is performed by an image pickup apparatus including an image pickup unit that picks up images to acquire picked-up images. The image combining method includes selecting, as an original image, a picked-up image of a subject including a face from the picked-up images acquired by the image pickup unit; selecting, as a process image, a picked-up image to be combined with the original image from the picked-up images acquired by the image pickup unit; issuing an instruction to combine the process image with the original image; detecting a face area from the original image, and detecting an eye area based on a result of detecting the face area; setting a combining position in the original image based on a position of the eye area; processing the process image; and combining the process image that is processed with the original image in the combining position in the original image, and generating a composite image.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The case where a digital camera is adopted as an image pickup apparatus is explained below as an example.

Figure 1:
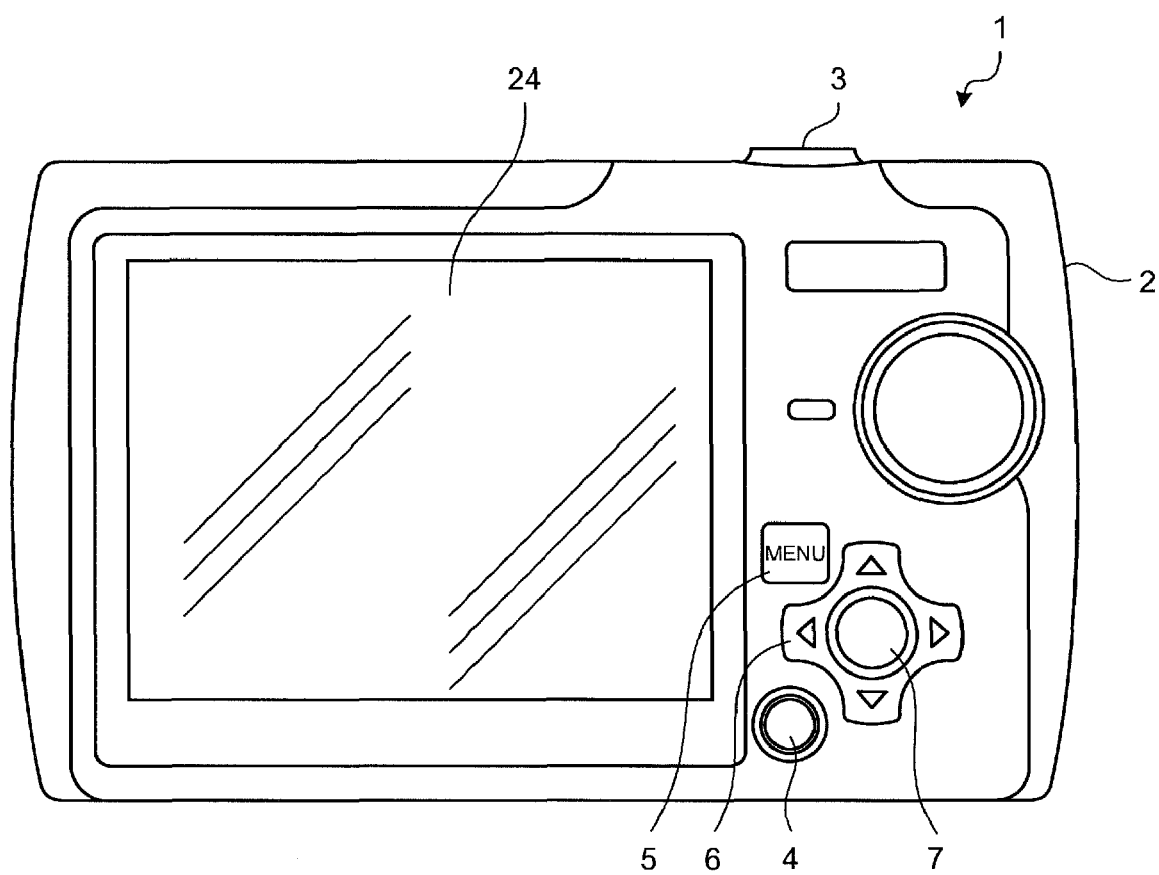
FIG. 1 is a back view of a digital camera according to an embodiment of the present invention.

FIG. 1 is a back view of a digital camera 1 according to an embodiment of the present invention. As shown in FIG. 1, the digital camera 1 includes a shutter button (release button) 3 for issuing an instruction for timing at which an image is picked up. The shutter button 3 is provided on the top surface of a camera body 2. The digital camera 1 further includes a power supply button 4 provided on the back surface of the camera body 2; a menu button 5 provided on the back surface of the camera body 2; a cross button 6 including upper, lower, right, and left buttons; an OK button 7 for, for example, determining an operation content; and a display unit 24 that displays various types of screens. An image-pickup lens is provided on the front surface of the camera body 2, although it is not shown in FIG. 1.

Figure 2:
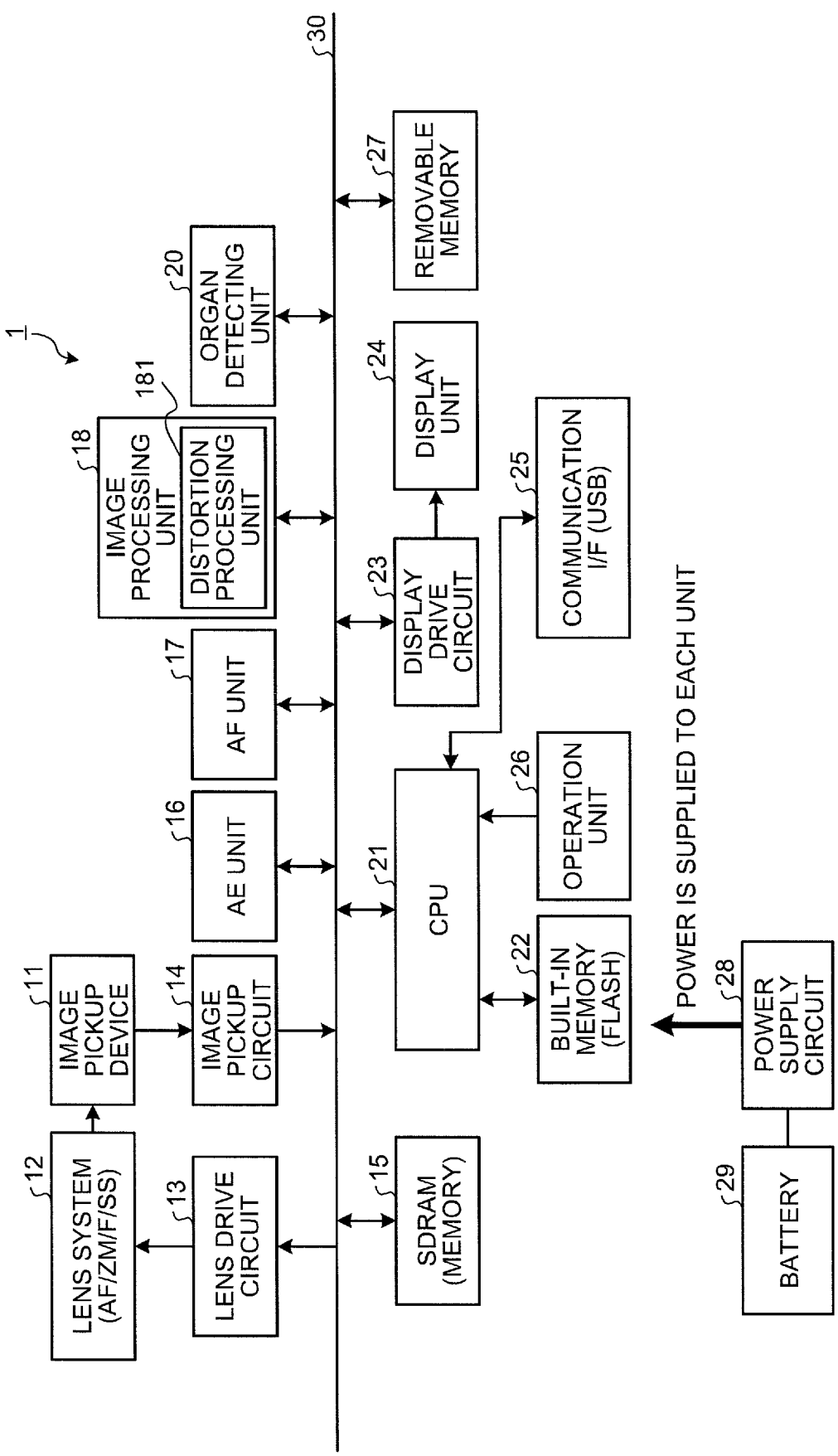
FIG. 2 is a block diagram of a system configuration of the digital camera.

FIG. 2 is a block diagram of a system configuration of the digital camera 1. As shown in FIG. 2, the digital camera 1 includes an image pickup device 11, a lens system 12, a lens drive circuit 13, an image pickup circuit 14, a synchronous dynamic random access memory (SDRAM) 15 serving as a storage unit, an AE unit 16, and an AF unit 17, an image processing unit 18, an organ detecting unit 20 serving as an eye detecting unit, a CPU 21, a built-in memory 22, a display drive circuit 23, the display unit 24, a communication I/F 25, an operation unit 26, a removable memory 27, a power supply circuit 28, and a battery 29. The image pickup circuit 14, the lens drive circuit 13, the SDRAM 15, the AE unit 16, the AF unit 17, the image processing unit 18, the organ detecting unit 20, the CPU 21, the display drive circuit 23, and the removable memory 27 are connected via a bus 30. The image pickup device 11, the lens system 12, the lens drive circuit 13, and the image pickup circuit 14 constitute an image pickup unit that picks up an image of a subject.

The image pickup device 11 is, for example, an image sensor such as a charge coupled device (CCD) or a complementary metal oxide semiconductor (CMOS), and it converts a light from a subject image that is incident on the image pickup device 11 via the lens system 12 to an analog electric signal.

The lens system 12 includes an image pickup lens including an auto focus (AF) lens and a zoom lens, an aperture, and a shutter. The lens drive circuit 13 drives the lens system 12 under control of the CPU 21.

The image pickup circuit 14 performs analog signal processing, such as correlated double sampling (CDS) and automatic gain control (AGC), on the analog electric signal output from the image pickup device 11. Thereafter, the image pickup circuit 14 converts the analog electric signal to a digital electric signal, performs digital signal processing, such as interpolation processing and color correction processing, on the digital electric signal, and outputs the processed signal as image data. The image data is temporarily stored in the SDRAM 15.

The SDRAM 15 is used to temporarily store the image data output from the image pickup circuit 14 and image data being processed by the image processing unit 18. For example, image data about a still image (hereinafter, "picked-up image") or image data about through images (live images) output from the image pickup circuit 14 at pickup timing is temporarily stored in the SDRAM 15. In an image pickup mode that is one of modes of the digital camera 1, images of the figure of a subject imaged on the image pickup device 11 is displayed on the display unit 24 in real time as moving images are displayed, and the images are are referred to as through images.

The AE unit 16 automatically determines an exposure based on the image data output from the image pickup circuit 14. The AF unit 17 automatically adjusts a focus based on the image data output from the image pickup circuit 14.

Figure 3:
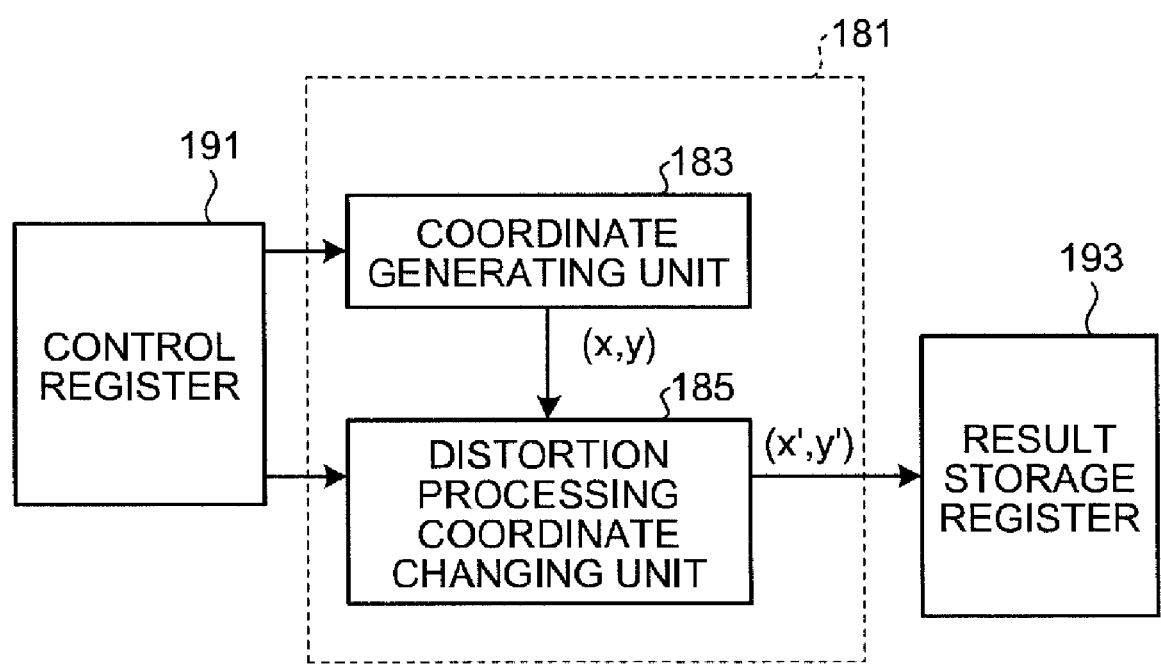
FIG. 3 is a block diagram of a configuration of a distortion processing unit.

The image processing unit 18 performs various types of image processing on the image data output from the image pickup circuit 14, and performs processing for converting the image data to image data appropriate for recording it, displaying it, or combining a catch light. For example, to record image data about a picked-up image or display recorded image data, compression processing or decompression processing based on the Joint photographic experts group (JPEG) method is performed on the image data. In addition, distortion processing for processing image data to obtain a distorted image, resizing processing for increasing or reducing the size of the image data by increasing or reducing the number of pixels, trimming processing for trimming image data, and adjustment processing for adjusting a luminance component or a color component of each pixel are performed. Furthermore, various types of processing, such as color adjusting processing or transparency processing, other than the above processing are performed. The image processing unit 18 includes a distortion processing unit 181 that performs the distortion processing. FIG. 3 is a block diagram of a configuration of the distortion processing unit 181. The distortion processing unit 181 sets a predetermined position in a process image as a distortion center, and distorts the process image about the distortion center at a predetermined distortion rate. As shown in FIG. 3, the distortion processing unit 181 includes a coordinate generating unit 183 and a distortion processing coordinate converting unit 185. The coordinate generating unit 183 generates an original coordinate (x, y) of a picked-up image (process image) to be processed through the distortion processing. The distortion processing coordinate converting unit 185 adopts a known method of distortion processing, converts an original coordinate (x, y) to a distortion processing coordinate (x', y'), and outputs the distortion processing coordinate (x', y'). Operations of the distortion processing unit 181 are controlled via a control register 191, and the distortion process coordinate (x', y') is stored in a result storage register 193.

Based on the image data about the picked-up image, the organ detecting unit 20 detects an area of a face (face area) in the image data by applying pattern matching that is a known technology, and detects each part of the face such as left and right eyes, nose, rips based on a result of detecting the face area. In the embodiment, eye areas of the left and right eyes are detected, and sizes, shapes, and an eye direction (visual axis) of the eyes are determined based on a result of detecting the eye areas. The eye direction can be determined using a known method appropriately. For example, positions of black portions of the eyes (hereinafter, "eye black portions") each including a pupil portion and an iris portion around the pupil portion in the eye area are detected. The sizes, shapes, and eye direction can be determined by combining a result on determination on whether the eye areas of both of the left and right eye areas are detected, the positions of the eye areas with respect to the face area, the positions of other face parts such as the nose and rips with respect to the face, and the positions of the eye black portions with respect to the eye areas. Data about the face parts including a coordinate of the position of the face area in the image of the person, coordinates of the positions of the eye areas, the sizes, shapes, and eye direction of the eyes are stored in the SDRAM 15.

The CPU 21 reads a camera program from the built-in memory 22 in response to an operation signal from the operation unit 26, executes the camera program to generally control operations of the digital camera 1 by, for example, transferring instructions or data to each unit constituting the digital camera 1. The built-in memory 22 is, for example, an electrically rewritable non-volatile memory such as a flash memory. In the built-in memory 22, are originally recorded various types of camera programs for realizing various types of functions of the digital camera 1 and data used while the camera programs are executed.

The display drive circuit 23 drives the display unit 24 under control of the CPU 21.

The display unit 24 displays, in addition to the picked-up images or the through images, various types of information about setting of the digital camera 1. The display unit 24 is, for example, a liquid crystal display (LCD) or an electroluminescence (EL) display. In the image pickup mode, through images are repeatedly displayed on the display unit 24 in each frame, so that through images are sequentially displayed as moving images are displayed. On the other hand, in a replay mode, picked-up images are displayed on the display unit 24.

The operation unit 26 receives various types of instructions issued via operations by a user for, for example, image pickup timing, setting a mode such as the image pickup mode or the replay mode, and setting image pickup conditions, and sends operation signals to the CPU 21. The operation unit 26 includes, for example, button switches with various functions. The operation unit 26 includes the shutter button 3, the power supply button 4, the menu button 5, the cross button 6, and the OK button 7.

The communication I/F 25 connects the digital camera 1 to an external device such as a personal computer based on a communication protocol such as Universal serial bus (USB).

The removable memory 27 is a memory card, such as an xD-Picture Card™ or a Compactflash™ memory card, that is removable from the digital camera 1. A reading-writing device (not shown) corresponding to the type of the removable memory 27 writes image data about a picked-up image in the removable memory 27, or reads image data recorded in the removable memory 27.

The power supply circuit 28 converts a power supplied from the battery 29 to a predetermined power, and supplies the converted power to each unit of the digital camera 1.

An outline of a catch light combining function that is one of functions of the digital camera 1 configured as described above is explained below. The digital camera 1 uses, as an original image, a picked-up image of a subject such as a person including a face, and performs processing for combining the catch light with the original image in the eye area of the original image. At this step, an image picked up before by the user of the digital camera 1 is processed as a process image (hereinafter, "template image"). The processed template image is combined as a catch light with the original image in the eye area in the original image.

Figure 4:
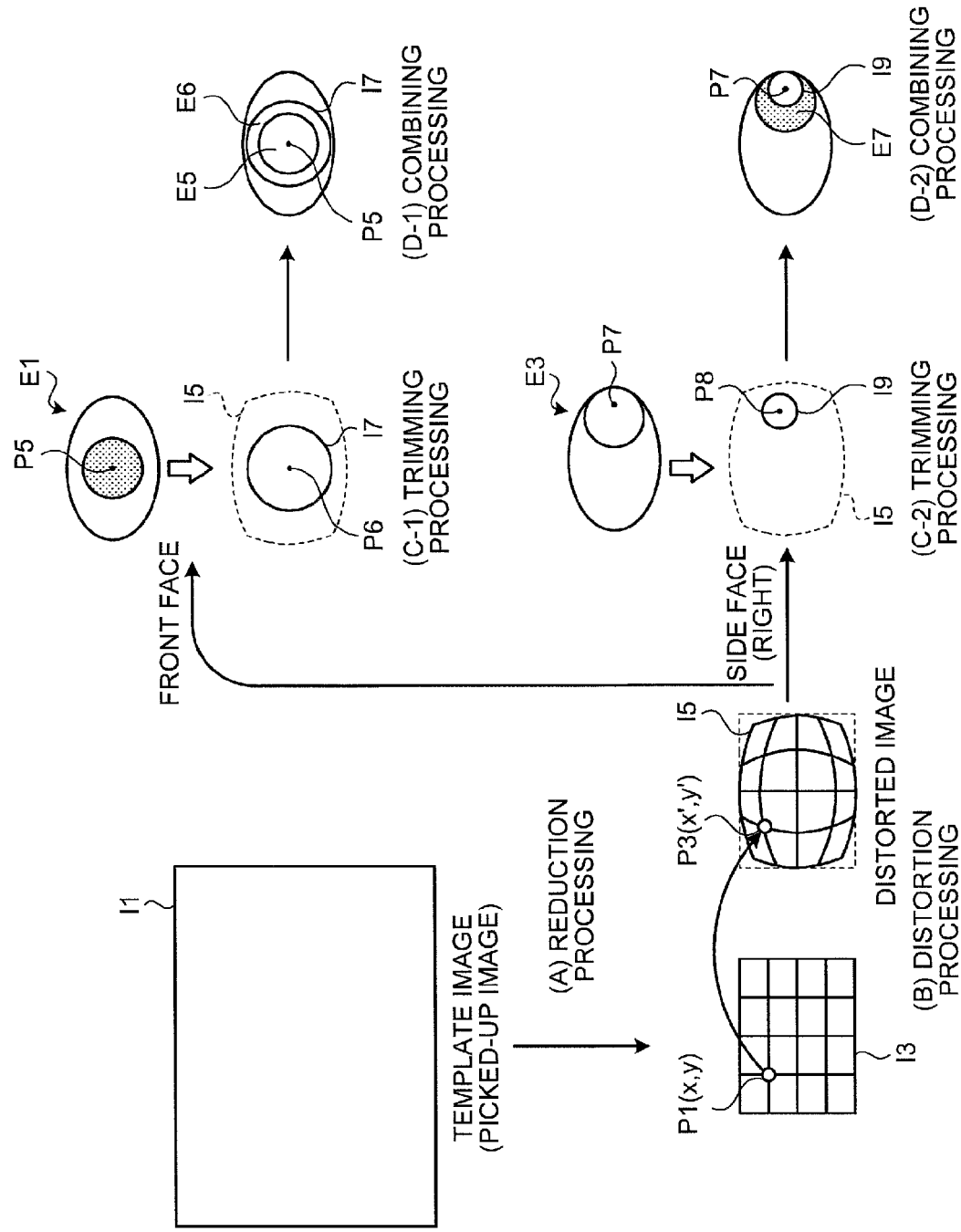
FIG. 4 is an explanatory diagram for explaining how a catch light is combined.

FIG. 4 is an explanatory diagram for explaining how a catch light is combined. To combine a catch light, an eye area in an original image is previously detected, and a size, a shape, and an eye direction of an eye are determined. Based on the determined eye direction, a reference position of a pupil (hereinafter, "pupil reference position") in the eye area is determined, and the pupil reference position is set as a combining position. Thereafter, a template image is processed based on the determined size, shape, and eye direction of the eye, and the processed template image is combined with the original image in the combining position in the original image. If both left and right eye areas are detected, combining positions are respectively set in the eye areas, and each template image is independently processed based on a size, a shape, and an eye direction of a corresponding eye. Each of the processed template images is combined with the corresponding original image in the corresponding combining position.

Figure 5:
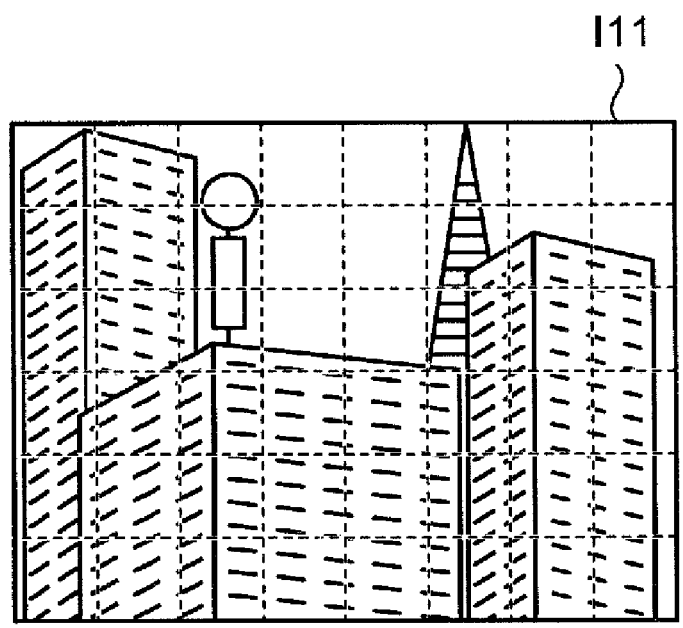
FIG. 5 is a diagram of an example of a reduced template image acquired by performing reduction processing.
Figure 6:
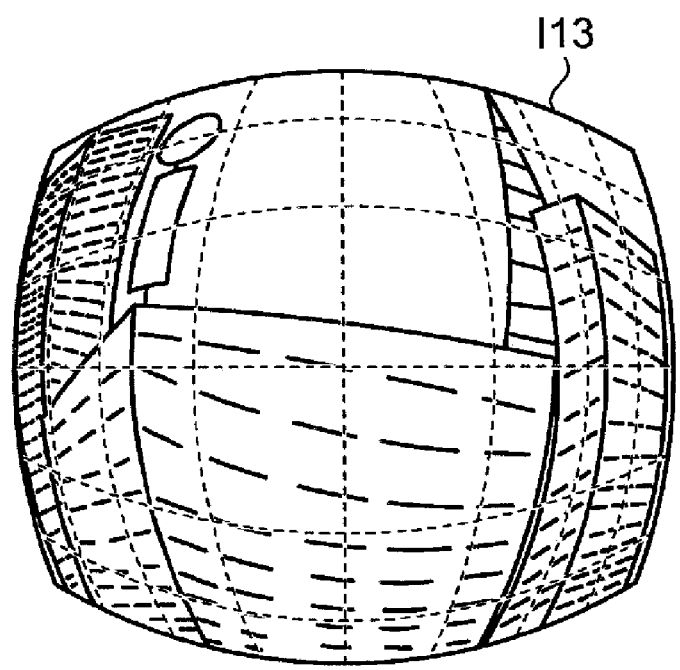
FIG. 6 is a diagram of an example of a distorted image obtained by performing distortion processing on the reduced template image shown in FIG. 5.

Specifically, as shown in FIG. 4, first, reduction processing is performed on a template image I1 to reduce the template image I1 at a reduction rate α (α<1) corresponding to a determined size of an eye (A). Subsequently, the distortion processing is performed on a reduced template image I3 to distort the template image I3 about a distortion center of the template image I3, so that a distorted image I5 is generated (B). At this step, the distortion processing unit 181 converts, for example, an original coordinate P1 (x, y) of the template image I3 is converted to a distortion processing coordinate P3 (x', y'). FIG. 5 is a diagram of an example of a reduced template image I11, and FIG. 6 is a diagram of an example of a distorted template image I13 obtained by performing the distortion processing on the reduced template image shown in FIG. 5. The distortion processing is performed on the reduced template image I11 because, after the template image is processed, the processed template image is finally combined with the original image in the eye area on which a spherical eyeball is displayed. For example, the reduced template image I11, which is obtained by performing the reduction processing at the pre-set predetermined reduction rate, is distorted, so that the distorted image I13 shown in FIG. 6 is obtained. This prevents unnaturalness in the combined image.

Subsequently, as shown in FIG. 4, the trimming processing is performed on the distorted image I5 to trim the distorted image I5 based on the determined shape of the eye to prevent the distorted image I5 from running over the eye area. Specifically, first, based on the pupil reference position (in this embodiment, "combining position") determined from the determined eye direction), a trimming position at which the distorted image is trimmed is set. If, for example, the determined eye direction extends forward, as shown in an upper portion in a part of the trimming processing (C-1) shown in FIG. 4, the center of an eye black portion in an eye area E1 is determined as a pupil reference position P5. In this case, from a relative position of the obtained pupil reference position P5 with respect to the eye area E1, a trimming position P6 is set in the distorted image I5. Accordingly, the trimming position P6 is set near the center of the distorted image I5 such that the trimming position P6 is approximately same as the relative position of the pupil reference position P5 with respect to the eye area E1. On the other hand, if the eye direction extends rightward, as shown in an upper portion in a part of the trimming processing (C-2) shown in FIG. 4, a pupil reference position P7 is determined as a position deviating rightward from the center of an eye black portion. In this case, from a relative position of the pupil reference position P7 with respect to an eye area E3, a trimming position P8 is set in the distorted image I5. Accordingly, in the distorted image I5, the trimming position P8 is set in the distorted image I5 in a position deviating rightward from the center of the distorted image I5.

As shown in a lower portion in a part of the trimming processing (C-1) shown in FIG. 4, a distorted image I7 in a pre-set predetermined trimming shape is obtained by trimming about the determined trimming position P6 serving as the center. Alternatively, as shown in a lower portion in the part of the trimming processing (C-2) shown FIG. 4, a distorted image I9 in a pre-set predetermined trimming shape is obtained by trimming about the determined trimming position P8 serving as the center. In the example shown in FIG. 4, the trimming shape is a circle. Specifically, the size of the trimming shape is determined based on the determined shape of the eye such that the trimmed image does not run over the eye area, and the distorted image I5 is trimmed in the determined size.

Finally, the trimmed distorted images I7 and I9 are combined with the original image at the combining positions in the eye area of the original image. If the overwriting target position in the original image is in the eye black portion, the original image is overwritten with color components and luminance components of the trimmed distorted image. On the other hand, if the overwriting target position in the original image is not in the eye black portion (eye white portion) and the trimmed distorted image is brighter than the overwriting target position in the original image, the original image is overwritten with only the luminance components of the trimmed distorted image. For example, in the combining processing (D-1) shown in FIG. 4, an eye black area E5 is overwritten with the color components and the luminance components of the trimmed distorted image I7. If the trimmed distorted image I7 is brighter than the overwriting target position in the original image, an eye white portion E6 is overwritten with only the luminance components of the distorted image I7. In the combining processing (D-2) shown in FIG. 4, on the other hand, because the overwriting target position of the trimmed distorted image I9 is within the eye black area E7, the eye black area E7 is overwritten with the color components and the luminance components of the trimmed distorted image I9. Therefore, even if the trimmed distorted image is combined with the original image in the position of the eye white portion, unnaturalness in the composite can be prevented.

Figure 7:
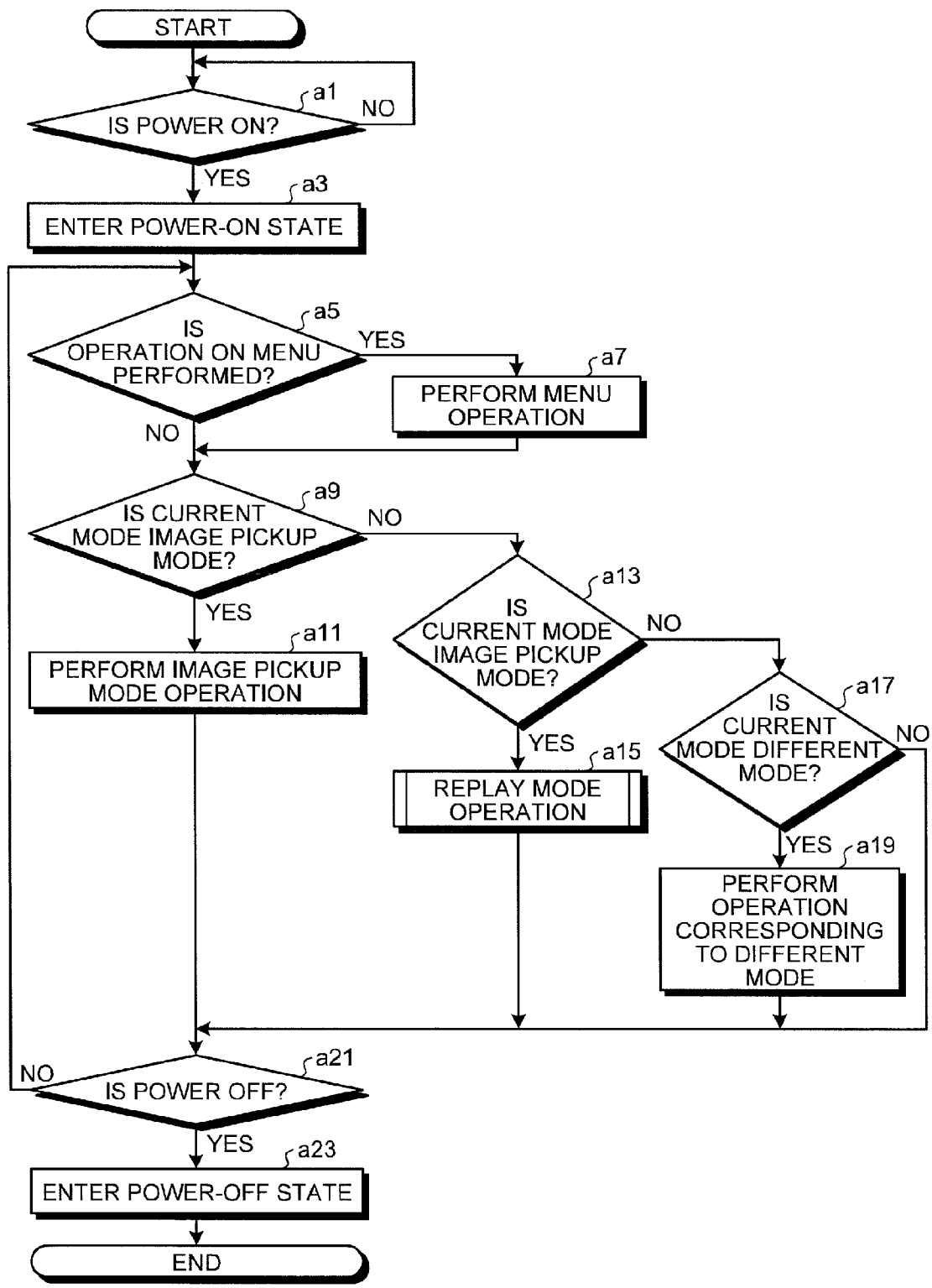
FIG. 7 is a flowchart of basic operations of the digital camera.

Operations of the digital camera 1 are explained below. FIG. 7 is a flowchart of basic operations of the digital camera 1. As shown in FIG. 7, when the power button 4 is pressed and the power is ON (YES at step a1), the digital camera 1 enters an ON state (step a3).

When an operation on a menu is performed (i.e., when the menu button 5 is pressed) (YES at step a5), the digital camera 1 shifts to a menu operation (step a7). In the menu operation, the CPU 21 starts menu processing, and causes the display unit 24 to display a menu screen on which menu items for, for example, setting modes and setting various types of image pickup conditions. The CPU 21 performs processing corresponding to a menu item selected by an operation by the user. In addition, in response to an operation signal from the operation unit 26, the CPU 21 performs processing for setting a mode or setting or changing the image pickup conditions. In the menu processing, a mode such as the image pickup mode or the replay mode can be set.

When no operation on the menu is performed (NO at step a5), the digital camera 1 shifts to an operation corresponding to the current mode. Specifically, when the current mode is the image pickup mode (YES at step a9), the digital camera 1 shifts to an image pickup mode operation (step a11). After the digital camera 1 shifts to the image pickup mode operation, the digital camera 1 enters to a through image display state in which through images are continuously displayed on the display unit 24. Specifically, the image data about the subject images formed on the image pickup device 11 is temporarily stored in the SDRAM 15, and a series of processing for displaying the image data on the display unit 24 is repeatedly performed, so that through images are successively displayed as moving images are displayed. The image pickup processing is performed at timing at which the shutter button 3 is pressed, and images in an image pickup range are generated as picked-up images. On the other hand, when the current mode is not the image pickup mode (NO at step a9) and the CPU 21 is in the replay mode (YES at step a13), the digital camera 1 shifts to a replay mode operation (step a15). In this case, the CPU 21 performs control such that the image data about the picked-up image recorded in the removable memory 27 is read and the image data is re-displayed and replayed on the display unit 24. When the current mode is not the replay mode (NO at step a13) and the CPU 21 is in a different mode (YES at step a17), the digital camera 1 shifts to an operation corresponding to the different mode (step a19).

When the power supply button 4 is pressed and the power supply is OFF (YES at step a21), the digital camera 1 enters an OFF state (step a23), and the basic operations are completed. When the power is not OFF (NO at step a21), the process goes back to step a5.

Figure 8:
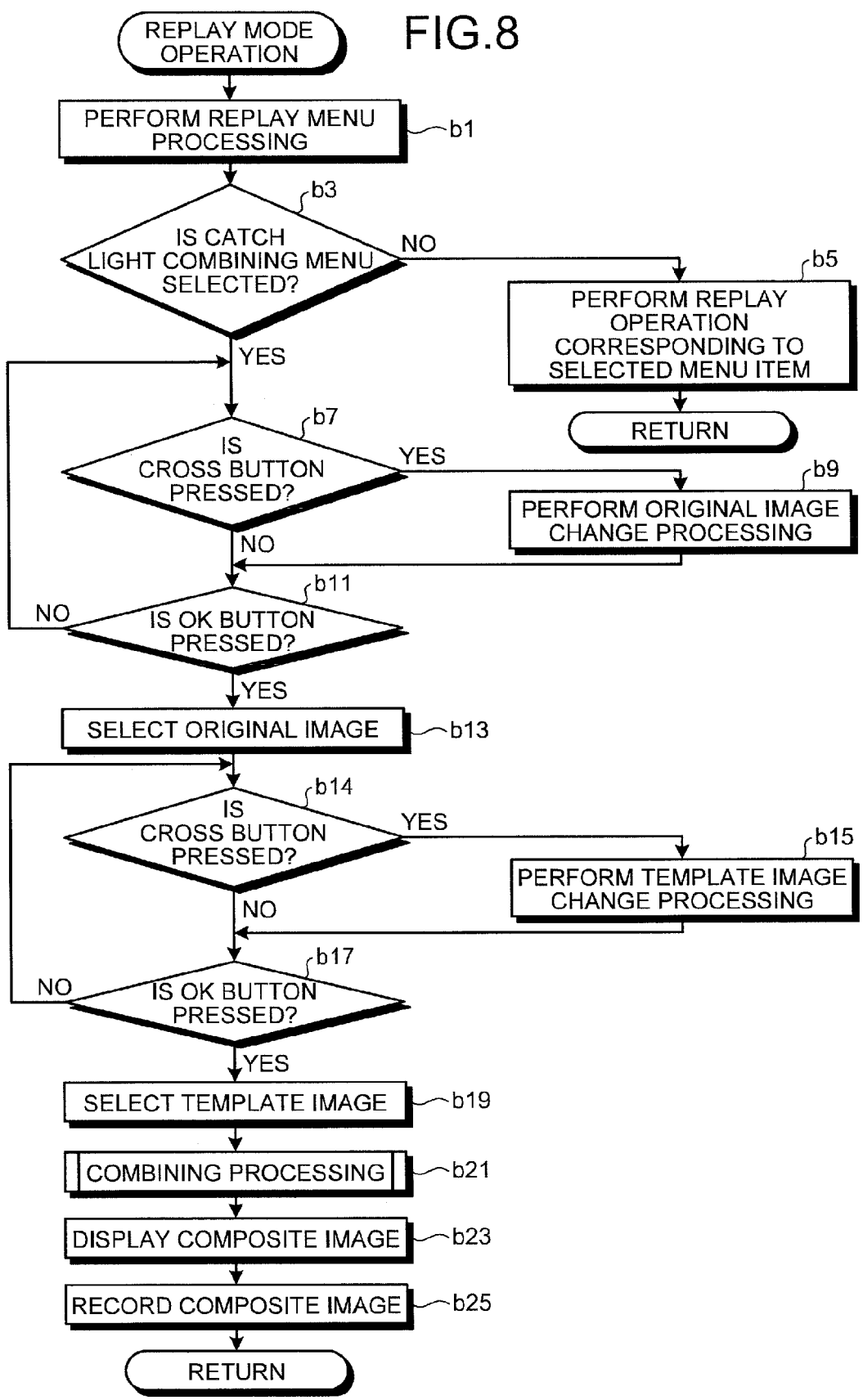
FIG. 8 is a flowchart of a replay mode operation of the digital camera.

Subsequently, the replay mode operation of the digital camera 1 in the replay mode is explained below. FIG. 8 is a flowchart of the replay mode operation of the digital camera 1. When the digital camera 1 shifts to the replay mode operation, the CPU 21 starts replay mode processing. First, the CPU 21 performs replay menu processing to cause the display unit 24 to display the menu items of the replay mode, and receives an instruction for selecting a menu item (step b1). When a menu item other than a catch light combining menu is selected (NO at step b3), the digital camera 1 shifts to a replay operation corresponding to the selected menu item (step b5). Thereafter, the process returns to step a15 shown in FIG. 7, and goes to step a21.

On the other hand, when the catch light combining menu is selected (YES at step b3), the CPU 21 serves as a picked-up image display control unit, and performs control such that the picked-up images recorded in the removable memory 27 are sequentially displayed and replayed on the display unit 24. The CPU 21 then receives an instruction for selecting an image with which a catch light is combined. Specifically, when the cross button 6 is pressed (YES at step b7), the CPU 21 performs original image change processing to change the picked-up image to be replayed, and performs control such that the changed picked-up image is displayed on the display unit 24 (step b9). When the OK button 7 is pressed (YES at step b11), the CPU 21 serves as an original image selecting unit, and selects a picked-up image being displayed on the display unit 24 as an original image (step b13). If the OK button 7 is not pressed (NO at step b11), the process goes back to step b7. The user selects a picked-up image of a subject including a face of a person as an original image.

Subsequently, the CPU 21 serves as a picked-up image display control unit, and performs control such that the picked-up images recorded in the removable memory 27 are displayed again and replayed on the display unit 24. Thereafter, the CPU 21 receives an instruction for selecting a template image to be combined with the original image selected at step b13. Specifically, when the cross button 6 is pressed (YES at step b17), the CPU 21 serves as a process image selecting unit, and selects a picked-up image being displayed on the display unit 24 as a template image (step b19). When the OK button 7 is not pressed (NO at step b17), the process goes back to step b14. The user selects, from the picked-up images, a picked-up image to be combined as a catch light with the original image in the eye area of the subject in the original image.

After selecting the original image and the template image in response to the instruction issued by the operation by the user, the CPU 21 serves as an image combining instructing unit, and controls start of the combining processing. The CPU 21 generates a composite image obtained by combining the template image as a catch light with the original image in the eye area of the original image (step b21). Thereafter, the CPU 21 serves as a composite image display control unit, and performs control such that the generated composite image is displayed on the display unit 24 (step b23), and performs control such that the composite image is recorded in the removable memory 27 serving as a recording unit (step b25). Thereafter, the process returns to step a15, and goes to step a21.

Figure 9:
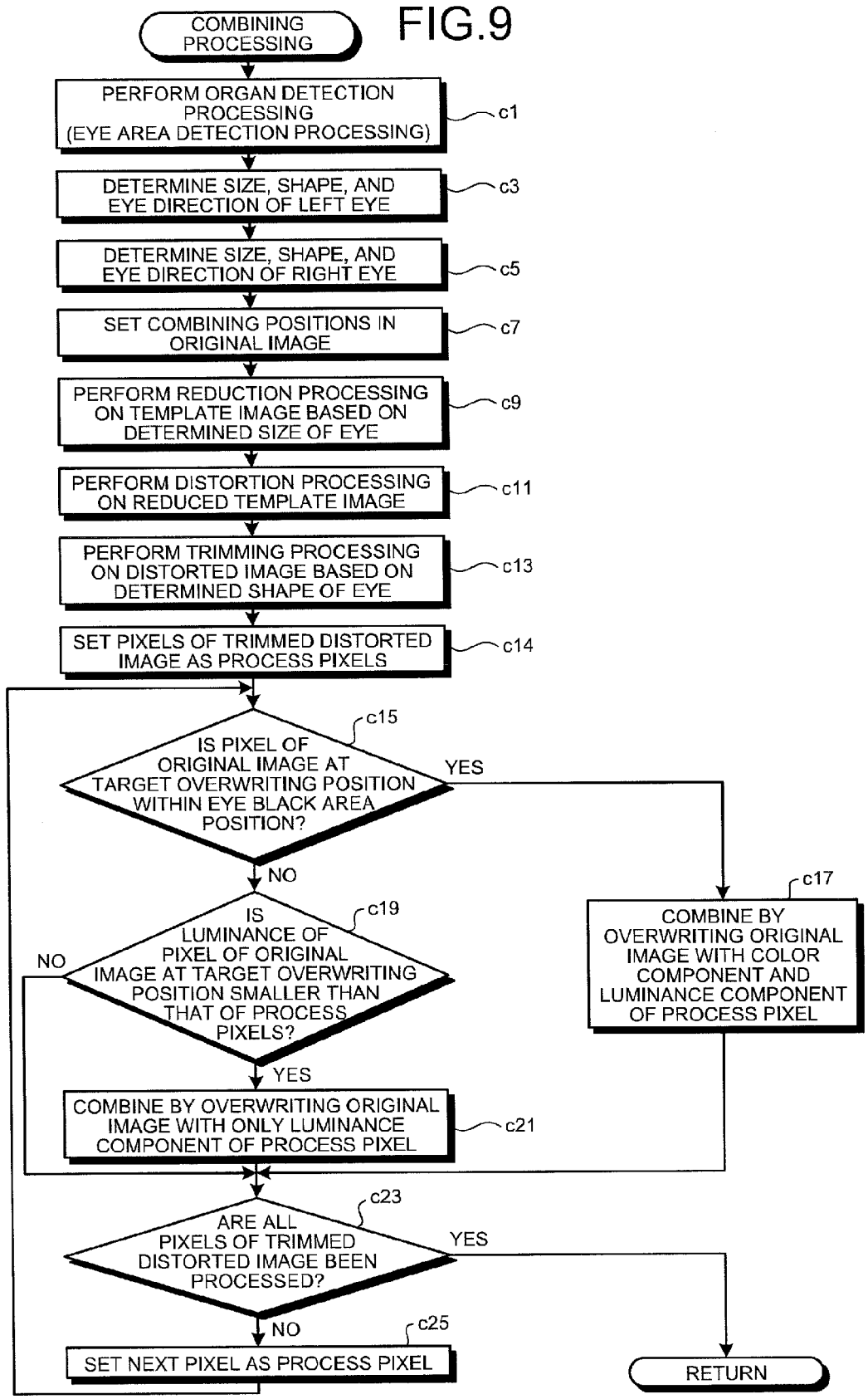
FIG. 9 is a flowchart of a detailed process procedure of combining processing.

FIG. 9 is a flowchart of a detailed process procedure of the combining processing. As shown in FIG. 9, in the combining processing, first, the organ detecting unit 20 performs organ detection processing to detect a face area from an original image and detect face parts including left and right eye areas based on a result of detecting the face area (step c1). The organ detecting unit 20 detects positions eye black portions in the eye areas. In addition, based on a result of detecting the eye areas, the organ detecting unit 20 determines a size, a shape, and an eye direction of the left eye (step c3), and determines a size, a shape, and an eye direction of the right eye (step c5). If only one eye area is detected at step c1 because, for example, the original image is a picked-up image of a side face of a subject, a size, a shape, and an eye direction about only the eye area are determined.

Subsequently, the image processing unit 18 serves as a combining position setting unit, and determines pupil reference positions in the eye areas based on, for example, the eye directions determined at steps c3 and c5, and sets the pupil reference positions as combining positions (step c7). When both of the left and right eye areas are detected, the pupil reference positions are set respectively as combining positions. Thereafter, the image processing unit 18 performs processing of steps c9 to c13 sequentially on the detected eye area (when the left and right eye areas are detected, the processing is performed on each of the eye areas independently). In this manner, the image processing unit 18 serves as an image processing unit and processes the template image, and serves as the image combining unit and combines the processed template images as catch lights with the original image in the corresponding combining positions set in the eye areas.

Specifically, first, the image processing unit 18 performs reduction processing on the template image (step c9). At step c9, the image processing unit 18 determines a reduction rate α based on the sizes of the eyes determined at steps c3 and c5, and reduces the template image at the reduction rate α. Subsequently, the distortion processing unit 181 of the image processing unit 18 performs distortion processing on the reduced template image to distort the image about, for example, the center of the template image serving as a distortion center (step c11). In the processing, the distortion processing unit 181 distorts the reduced template image and generates a distorted image. Subsequently, the image processing unit 18 performs the trimming processing on the distorted image (step c13). Specifically, in accordance with the pupil reference positions determined from the eye directions determined at steps c3 and c5, the image processing unit 18 sets trimming positions in the distorted image based on relative positions of the pupil reference positions with respect to the corresponding eye areas. In the embodiment, the combining positions set at step c7 correspond to the pupil reference positions. The image processing unit 18 trims the distorted image about the set trimming positions serving as the centers based on the shapes of the eyes determined at steps c3 and c5 such that the distorted images do not run over the corresponding eye areas, respectively.

Subsequently, the image processing unit 18 sequentially sets pixels of the trimmed distorted image as process pixels (step c14). Thereafter, based on the combining positions in the eye areas in the original image, the image processing unit 18 determines whether pixels of overwriting target positions in the original image corresponding to the set process pixels are within the eye black portions. When a pixels at the overwriting target position is in the eye black portion (YES at step c15), the image processing unit 18 combines the distorted image with the original image by overwriting a color component and a luminance component of the pixel of the overwriting target position in the original image with a color component and a luminance component of the process pixel (step c17), and the process goes to step c23. On the other hand, when a pixel at the overwriting target position is not in the eye black portion (NO at step c15), the image processing unit 18 compares a luminance component of the pixel on the overwriting target position in the original image with a luminance component of the process pixel. When the luminance of the pixel on the overwriting target position is not smaller than that of the process pixels (NO at step c19), the process goes to step c23. On the other hand, when the luminance of the pixel on the overwriting target position is smaller than that of the process pixel (YES at step c19), the image processing unit 18 combines the distorted image with the original image by overwriting a luminance component of a pixel on the overwriting target position in the original image with the luminance component of the process pixel (step c21). Thereafter, the process goes to step c23.

At step c23, it is determined whether the processing of steps c15 to c21 are already performed on all pixels of the trimmed distorted image as process pixels. When not all pixels are processed (NO at step c23), the next pixel is set as a process pixel (step c25), and the process goes back to step c15. When all pixels are already processed (YES at step c23), the process returns to step b21 shown in FIG. 8, and goes to step b23.

Figure 10:
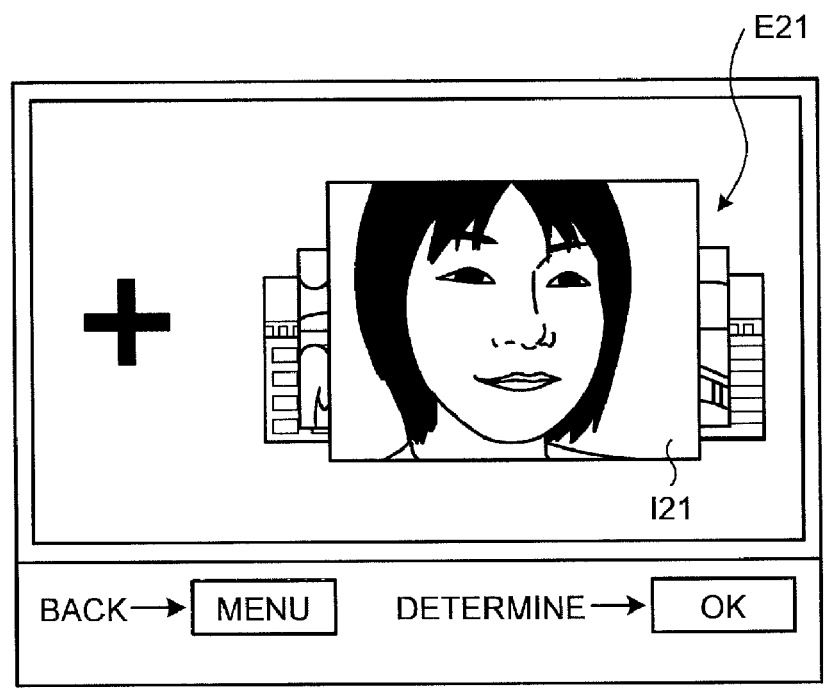
FIG. 10 is a diagram of an example of transition of a screen for explaining a first example of an operation of the digital camera.
Figure 11:
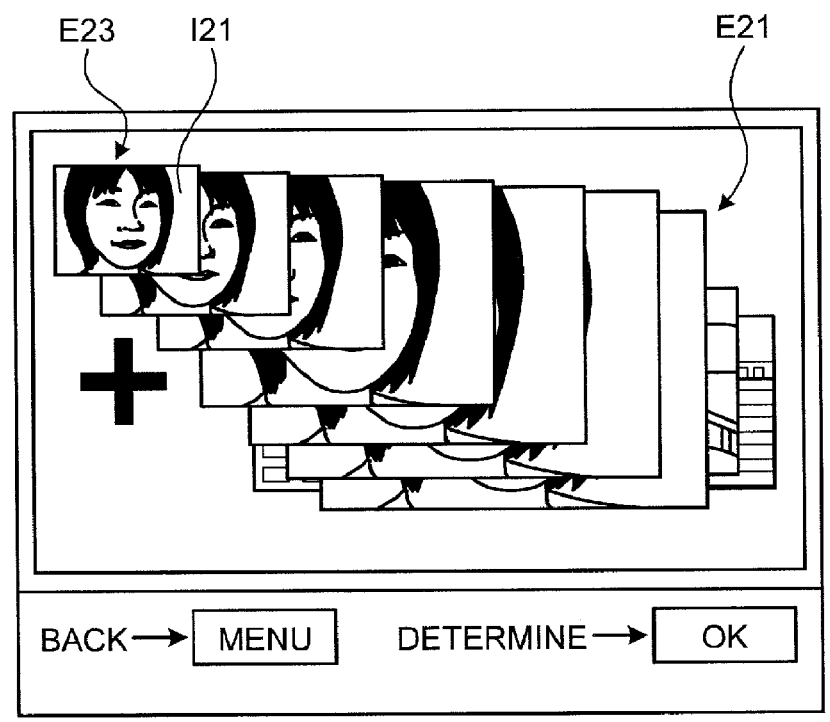
FIG. 11 is a diagram of an example of the transition of the screen for explaining the first example of an operation of the digital camera.

An example of an operation of the digital camera 1 to combine a template image as a catch light with an original image in an eye area of the original image is explained below. FIGS. 10 to 14 are diagrams of a first example of transition of a display screen that is displayed on the display unit 24 when the catch light combining menu is selected. FIGS. 10 to 14 show a first example of an operation of the digital camera 1 to combine a template image as a catch light with an original image in an eye area in the original image. When the mode is changed to the replay mode and the catch light combining menu is selected from the replay menu, first, as shown in FIG. 10, picked-up images picked up before and recorded in the removable memory 27 are displayed and replayed in a picked-up image display area E21 at the center of the screen. The front most picked-up image in the picked-up image display area E21 is changed in response to an operation by the user. Specifically, the user presses the cross button 6 to change the front most picked-up image in the picked-up image display area E21. By pressing the OK button 7 in the state where a desired picked-up image of a subject including a face of a person is displayed at the front, an operation for selecting an original image is performed. For example, if the OK button 7 is pressed in the sate shown in FIG. 10, as shown in FIG. 11, a picked-up image I21 at the front in a picked-up image display area E21 is gradually reduced while moving to an original image display area E23 on an upper left side of the screen. Finally, the picked-up image I21 is displayed in a reduced size in the original image display area E23, and selected as an original image.

Figure 12:
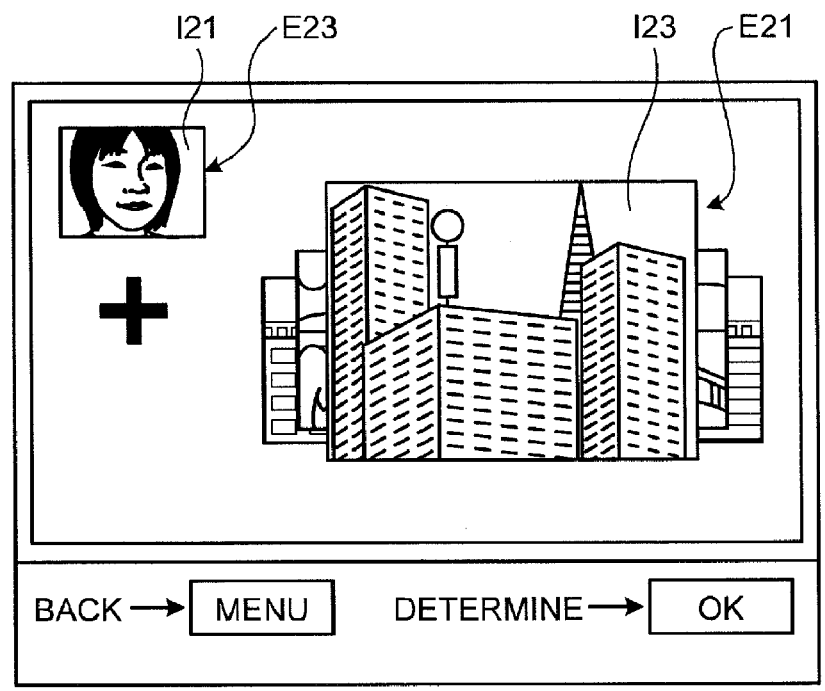
FIG. 12 is a diagram of an example of the transition of the screen for explaining the first example of an operation of the digital camera.
Figure 13:
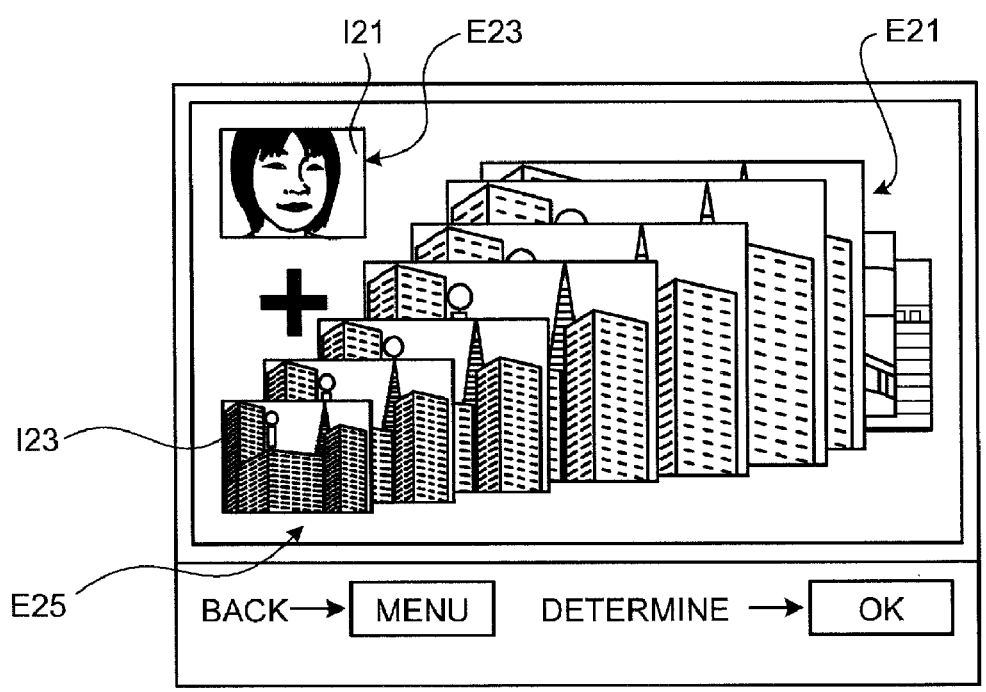
FIG. 13 is a diagram of an example of the transition of the screen for explaining the first example of an operation of the digital camera.

After the original image is selected, as shown in FIG. 12, in the state where the picked-up image I21, which is the original image, is displayed in a reduced size in the original image display area E23 on the upper left side of the screen, the picked-up images are displayed again and replayed in the picked-up image display area E21 at the center of the screen. The front most picked-up image in the picked-up image display area E21 is changed in response to an operation by the user, and the picked-up images are sequentially displayed. As in the case of selecting the original image, the user changes the front most picked-up image in the picked-up image display area E21 by pressing the cross button 6. An operation for selecting a template image is performed by pressing the OK button 7 in the state where a desired picked-up image is displayed at the front. For example, when the OK button 7 is pressed in the state shown in FIG. 12, as shown in FIG. 13, a picked-up image I23 at the front in the picked-up image display area E21 is gradually reduced while moving to a template image display area E25 on a lower left side of the screen. Finally, the picked-up image I23 is displayed in a reduced size in the template image display area E25, and selected as a template image.

Figure 14:
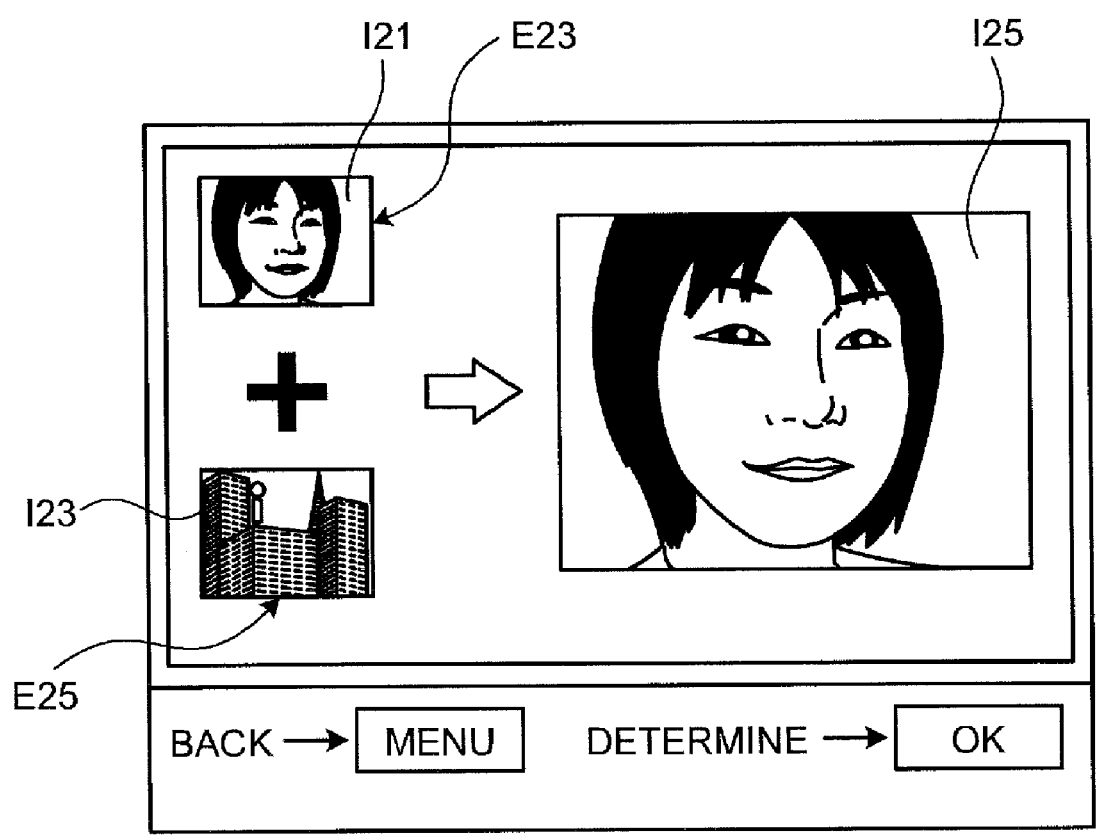
FIG. 14 is a diagram of an example of the transition of the screen for explaining the first example of an operation of the digital camera.

After the template image is selected, the combining processing shown in FIG. 9 is performed as internal processing, and the reduction processing, distortion processing, and the trimming processing are sequentially performed on the template image. Thereafter, by combining the picked-up image I23, which is the processed template image, as catch lights with the original image in the left and right eye areas of the picked-up image I21, which is the original image, a composite image I25 is generated. Thereafter, as shown in FIG. 14, the composite image I21, which is the original image, is displayed in a reduced size in the original image display area E23 on the upper left side of the screen. Furthermore, in the state where the picked-up image I23, which is the template image, is displayed in a reduced size in the original image display area E25 on the lower left side of the screen, the composite image I25 is displayed at the center of the screen. The composite image I25 is the image obtained by combining the picked-up image I23, on which the processing including the distortion processing explained with reference to FIG. 6 are performed, as catch lights in the eye areas. By pressing the OK button 7, the composite image I25 is recorded in the removable memory 27.

In the first operation example, the composite image, which is obtained by combining the processed template image as catch lights with the selected original image in the eye areas of the original image, can be seen on the same screen with the picked-up images selected as the original image and the template image. In addition, in the operation for selecting an image, the picked-up images are displayed at the center of the screen. When selecting the template image, the original image already selected is displayed in the reduced size, and the picked-up images at the center of the screen are displayed in a size larger than that of the original image. This allows the user to easily see picked-up images when selecting an original image or a template image from the picked-up images. Furthermore, after the original image and the template image are selected, the selected original image and template image are displayed in the reduced sizes, and a composite image at the center of the screen is displayed in a size larger than those of the original image and the template image. This allows the user to easily see the composite image.

Figure 15:
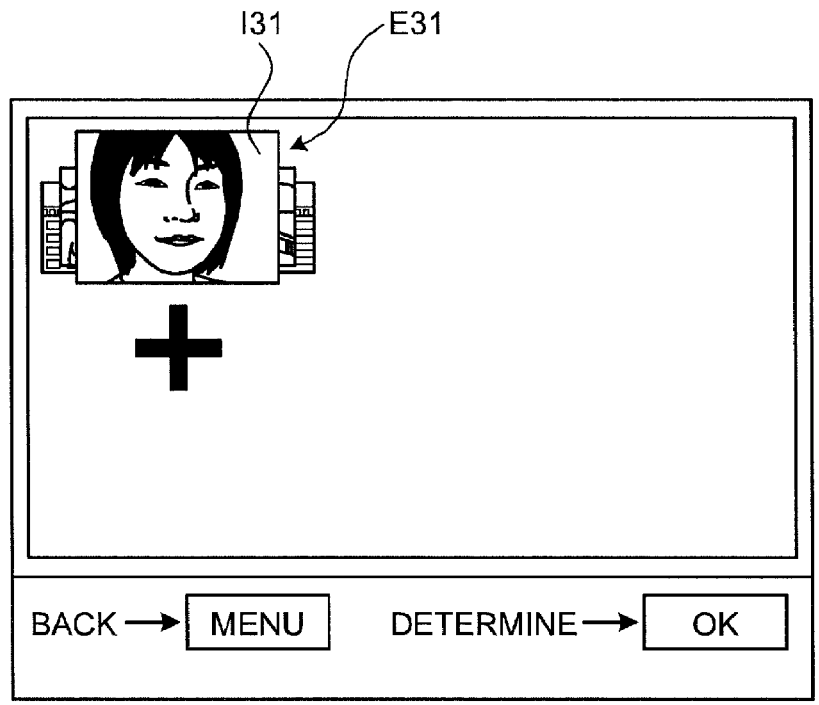
FIG. 15 is a diagram of an example of transition of the screen for explaining a second example of an operation of the digital camera.
Figure 16:
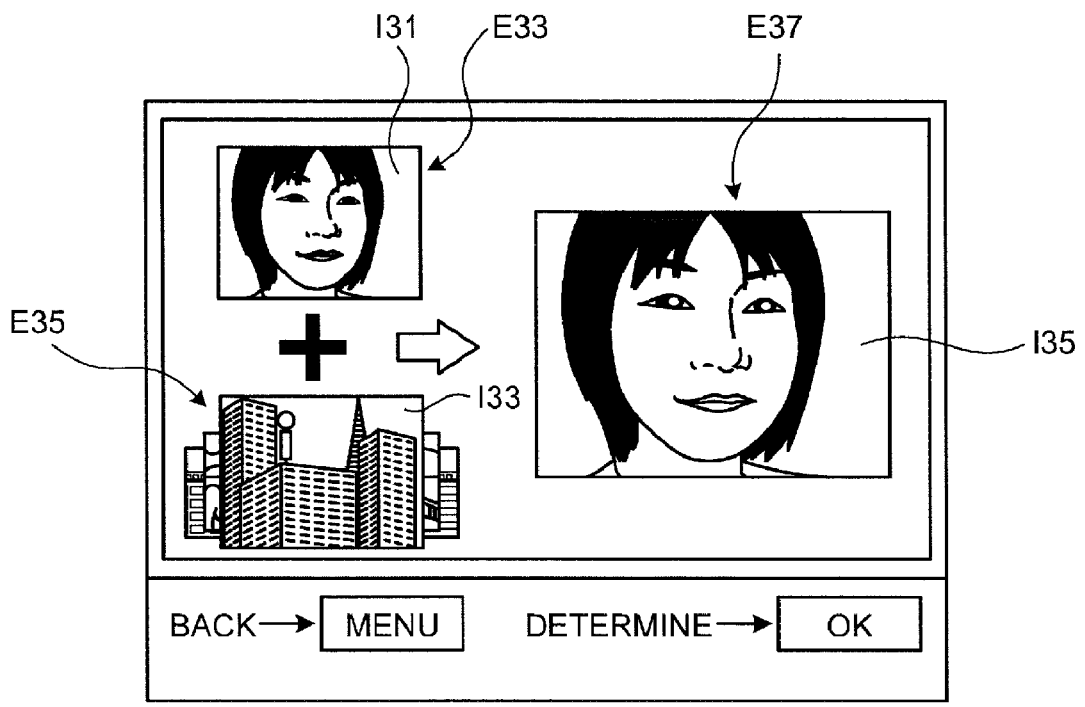
FIG. 16 is a diagram of an example of the transition of the screen for explaining the second example of an operation of the digital camera.

FIGS. 15 and 16 are diagrams of another example of the transition of the screen displayed on the display unit 24 when the catch light combining menu is selected, and they show a second example of the operation of the digital camera 1 to combine a template image as a catch light with an original image in an eye area of the original image.

In the second operation example, the mode is switched to the replay mode, and the catch light combining menu is selected from the replay menu. First, as shown in FIG. 15, picked-up images picked up before and recorded in the removable memory 27 are displayed and replayed in an original image selecting area E31 on an upper left side of the screen. The front most picked-up image in the original image selecting area E31 is changed in response to an operation by the user, so that the picked-up images are sequentially displayed. The user changes the front most picked-up image in the original image selecting area E31 by pressing the cross button 6, and performs an operation of selecting an original image by pressing the OK button 7 in the state where a desired picked-up image of a subject including a face is displayed at the front.

For example, when the OK button 7 is pressed in the state shown in FIG. 15, a picked-up image I31 at the front in the original image selecting area E31 is selected as an original image. Subsequently, as shown in FIG. 16, in the state where the picked-up image I31, which is the original image, is displayed in a reduced size in an original image display area E33 on an upper left side of the screen, the picked-up images are replayed and displayed in a template image selecting area E35 on a lower left side of the screen. The front most picked-up image in the template image selecting area E35 is changed in response to an operation by the user, so that the picked-up images are displayed sequentially. The user can change the front most picked-up image in the template image selecting area E35 by pressing the cross button 6, and select a desired picked-up image as a template image. Furthermore, in the second operation example, in each time when the front most picked-up image is changed in the template image selecting area E35, a composite image is displayed as a preview in a composite image display area E37 at the center of the screen. Specifically, as internal processing, processing is performed for processing the picked-up image I33 at the front in the template image selecting area E35, and for combining the processed picked-up image I33 as catch lights with the picked-up image I31, which is the original image, in the eye areas of the picked-up image I31. As a result, a composite image I35 is generated and displayed in the composite image display area E37 at the center of the screen. For example, when the OK button 7 is pressed in the state shown in FIG. 16, the composite image I35 is recorded in the removable memory 27. On the other hand, when the cross button 6 is pressed without pressing the OK button 7, the front most picked-up image in the template image selecting area E35 is changed. Thereafter, as internal processing, processing for processing the front most picked-up image newly displayed in the template image selecting area E35, and for combining the processed picked-up image as catch lights with the picked-up image I31, which is the original image, in the eye areas of the picked-up image I31. As a result, the display in the composite image display area E37 is updated and a newly generated composite image is displayed.

In the second operation example, the template image can be changed in the template image selecting area E3 in the state where the original image is selected. As a result of changing the template image, the composite image acquired by combining the template image as catch lights with the selected original image in the eye areas of the original image can be seen in real time. The composite image varies depending on a selected template image (specifically, a luminance distribution of a selected template image). However, in the second operation example, a template image to be combined with the original image can be selected while seeing the composite image. In addition, the picked-up images selected as the original image and the template image can be seen with the composite image on the same screen.

As explained above, in the embodiment, a picked-up image is processed as a template image, and the picked-up image can be combined as catch lights with a picked-up image of a subject including a face in eye areas of the picked-up image. The picked-up image to be used as a template image can be arbitrarily selected from picked-up images of a person or scenery, which were picked up by the user before, and the picked-up image has a natural luminance distribution. Because of the natural luminance distribution obtained while the image is picked up, a natural catch light can be combined with a simple configuration without preparation of a material to be combined as catch lights in an eye area. Furthermore, because the template image is processed by performing the reduction processing, the distortion processing, and the trimming processing, natural catch lights can be achieved.

The preferred embodiment of the present invention is explained above. However, the present invention is not limited to this, and modifications can be made appropriately within the scope of the present invention.

Figure 17:
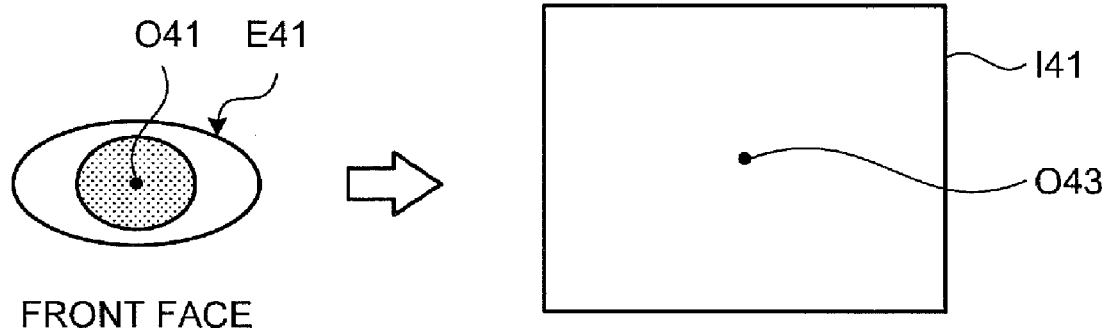
FIG. 17 is a diagram for explaining a method of setting a distortion center in a modification.
Figure 18:
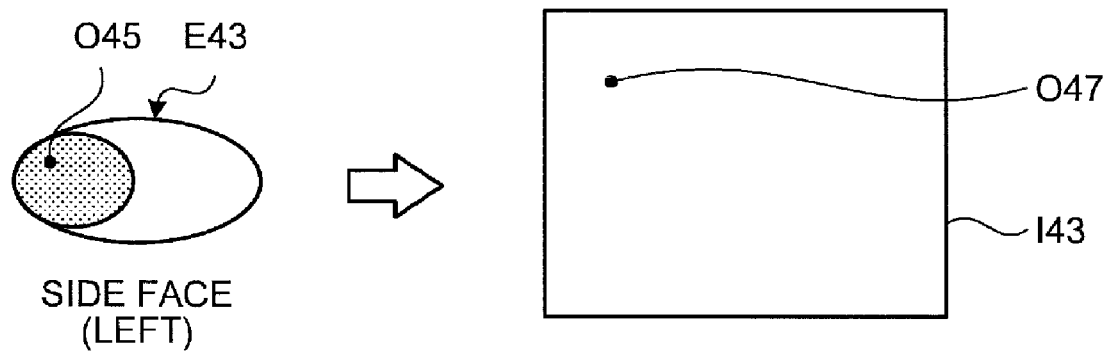
FIG. 18 is a diagram for explaining a method of setting a distortion center in another modification.

For example, in the above embodiment, the case is explained where the center of the reduced image is set as the distortion center used in the distortion processing. Alternatively, the distortion center of the reduced template image can be set in accordance with the pupil reference position of determined from the eye direction of the eye, based on a relative position of the pupil reference position with respect to the corresponding eye area. FIGS. 17 and 18 are diagrams for explaining a method of setting the distortion center in this case. For example, the case shown in FIG. 17 where the eye direction extends forward is explained below. In this case, the center of an eye black area in an eye area E41 is set as a reference position O41, and a distortion center O43 is set near the center of a reduced template image I41 such that the distortion center O43 is approximately same as the relative position of the reference position O41 with respect to the eye area E41. On the other hand, when an eye direction extends leftward, as shown in FIG. 18, a pupil reference position O45 is determined as a position deviating leftward from the center of the eye black area. In this case, a distortion center O47 in a reduced template image I43 is set from a relative position of the reference position O45 with respect to an eye area E43.

Figure 19:
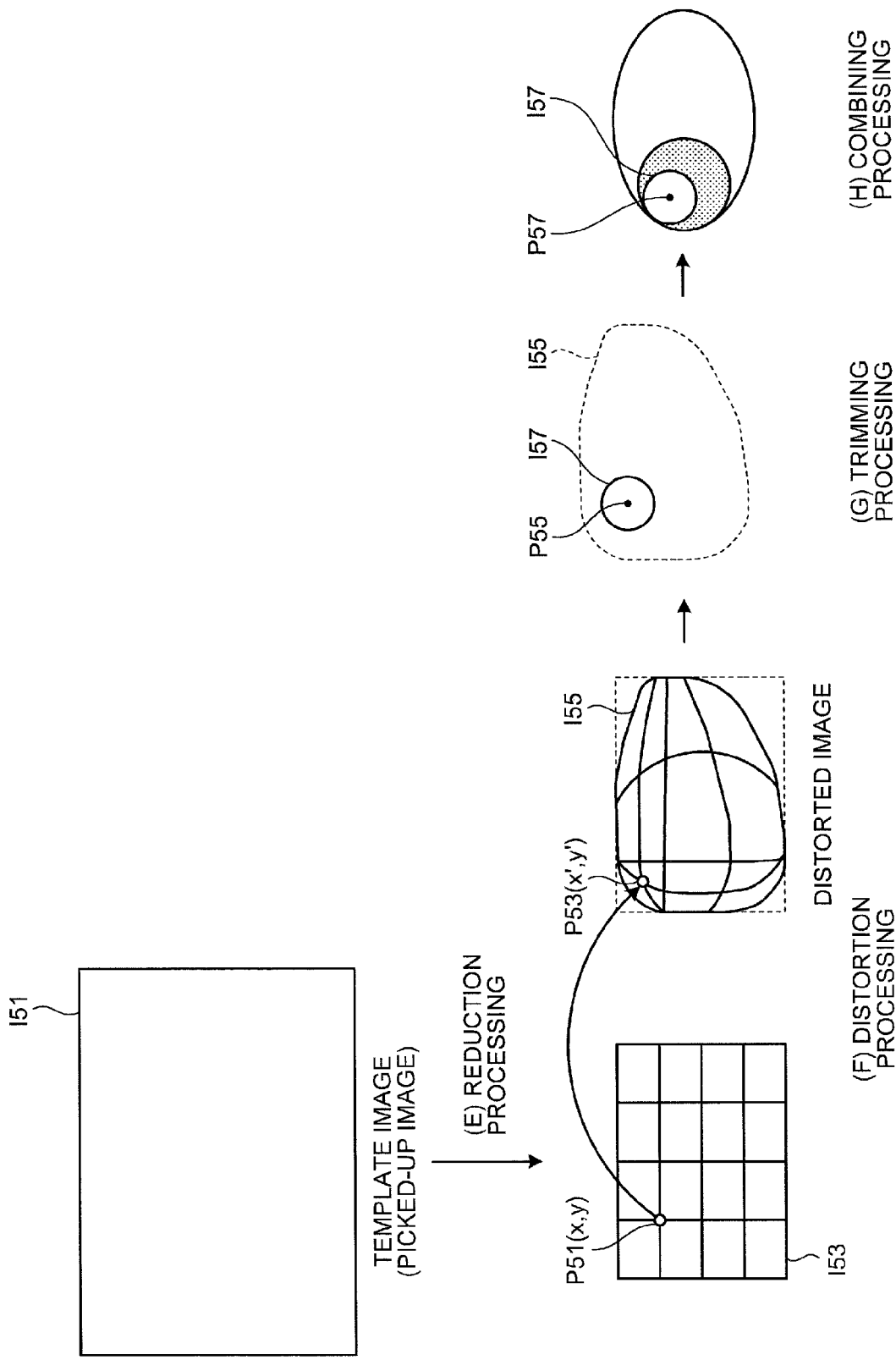
FIG. 19 is an explanatory diagram for explaining how a catch light is combined in a modification.

FIG. 19 is an explanatory diagram for explaining how a catch light is combined in a modification. In this modification, as in the case of the above embodiment, first, the reduction processing is performed on a template image I51 (E). Subsequently, as explained with reference to FIGS. 17 and 18, a distortion center is set in a reduced template image I51 from a relative position of a pupil reference position with respect to an eye area, and generates a distorted image I55 by distorting the template image I51 about the distortion center (F). In the example shown in FIG. 19, the distortion processing unit 181 converts, for example, an original coordinate P51 (x, y) in a reduced template image I53 to a distortion processing coordinate P53 (x', y'). Subsequently, as shown in FIG. 19, the trimming processing is performed on a distorted image I55 to obtain a distorted image I55 by trimming along the determined shape of the eye such that the distorted image I55 does not run over the eye area (G). Specifically, for example, the distortion center in the distorted image I55 is set as a trimming position P55, and the distorted image I55 is trimmed about the trimming position P55 serving as the center. Finally, the trimmed distorted image I57 is combined with the original image in an eye area in a combining position, which is a reference position P57 in the eye area of the original image, in the original image (H).

Figure 20:
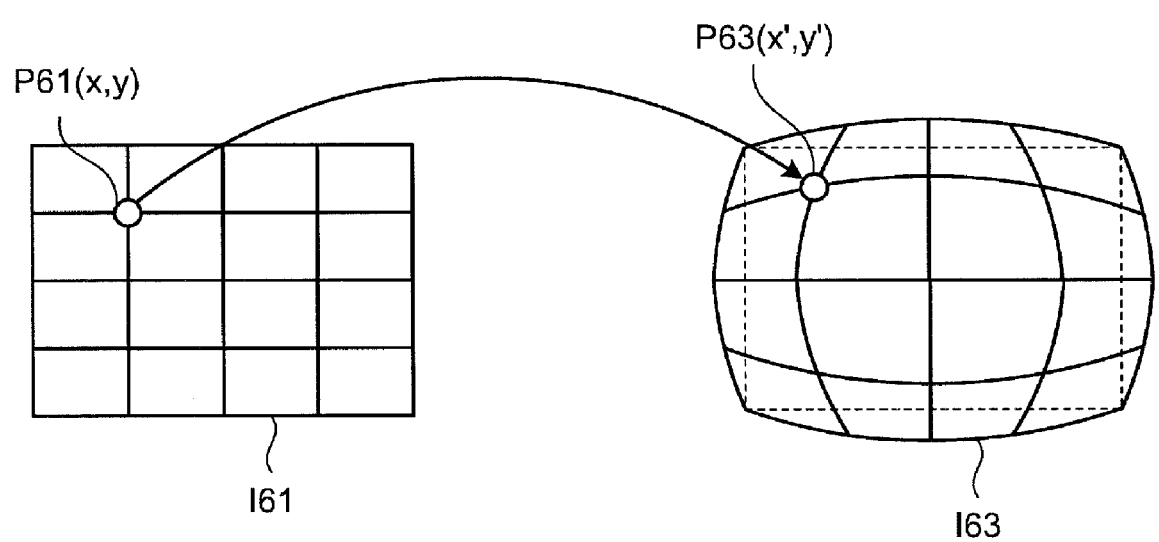
FIG. 20 is a diagram for explaining a modification of the distortion processing.

In the above embodiment, the distortion processing is explained as the case where the reduced template image is distorted such that the template image is inscribed on the rectangle. However, the distortion processing is not limited to this. FIG. 20 is a diagram for explaining a modification of the distortion processing. For example, the distortion processing can be performed in a way that an original coordinate P61 (x, y) in a reduced template image I61 is converted to a distortion processing coordinate P63 (x', y'). In this case, a distorted image I61 is generated by distorting the reduced template image I61 such that the template image I61 is circumscribed with a rectangle.

Alternatively, the trimming processing may be performed on the distorted image such that the distorted image does not run over the pupil, based on the size and shape of the pupil (eye black area). With this method, the processed image can be combined as a catch light in a portion of the pupil in the eye area. In this case, a shape along the outer shape of the pupil may be determined as a trimming shape used in the trimming processing.

Alternatively, a configuration may be adopted in which, after the processed template image is combined as a catch light with the original image in the eye area of the original image, the position of the catch light can be adjusted in response to an operation by the user. For example, after the control is performed such that the composite image is displayed on the display unit 24 at step b23 shown in FIG. 8 and before the composite image is recorded at step b25, control is performed such that a message for an instruction for adjusting a catch light position is displayed on the display unit 24. In this case, for example, instructions for adjusting the catch light position with the cross button 6 in four directions, i.e. upward, downward, leftward, and rightward directions may be received, and the an operation may be determined with the OK button 7.

The above embodiment is explained as the case where the distortion processing is performed at a predetermined distortion rate. The distortion rate may be changed depending on, for example, the size, shape, and eye direction of the eye or the pupil reference position calculated from the eye direction. In this case, the distortion rate may be previously stored in the built-in memory 22 or the SDRAM 15.

The trimming processing in the above embodiment is explained as the case where the trimming shape is a circle. Alternatively, the trimming shape may be other shapes including an oval. Alternatively, a configuration may be adopted in which a plurality of patterns of trimming shapes may be previously stored in the built-in memory 22 or the SDRAM 15, and an appropriate trimming shape may be selected depending on the size, shape, and eye direction of the eye or the pupil reference point calculated from the eye direction.

The above embodiment is explained as the case where the distortion processing, the reduction processing, and the trimming processing are performed on the picked-up image selected as the template image. Alternatively, the template image may be processed by performing brightness adjustment processing, tone adjustment processing, and transparency processing on the template image. In this case, when the template image is processed by performing the transparency processing thereon, a transmittance used in the transparency processing may be previously stored in the built-in memory and the SDRAM 15, and the transparency processing may be performed on the template image based on the transmittance.

In the above embodiment, the template image is processed by performing the reduction processing on the template image based on the size of the eye, and then, performing the distortion processing. Alternatively, the distortion processing may be performed first, and then, the reduction processing may be performed based on the size of the eye.

The above embodiment is explained as the case where, first, the original image is selected from the picked-up images, and then, the process image to be combined as catch lights with the original image in the eye area of the original image is selected. Alternatively, the original image may be selected after the process image is selected.

With the image pickup apparatus and the image combining method of the image pickup device according to the embodiment, a picked-up image having a natural luminance distribution is processed as a process image, and the process image can be combined as a catch light with a of a subject including a face in an eye area of the picked-up image. Therefore, it is not necessary to prepare a material to be combined as a catch light in the eye area, and a natural catch light can be combined in the eye area with a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus comprising:
an image pickup unit that picks up images to acquire picked-up images;
an original image selecting unit that selects, as an original image, a picked-up image of a subject including a face from the picked-up images acquired by the image pickup unit;
a process image selecting unit that selects, as a process image, a picked-up image to be combined with the original image from the picked-up images acquired by the image pickup unit;
an image combining instructing unit that issues an instruction to combine the process image with the original image;
an eye detecting unit that detects a face area from the original image, and detects an eye area of an eye based on a result of detecting the face area;
a combining position setting unit that sets a combining position, in which the process image selected by the process image selecting unit is to be combined as a catch light, in the original image based on a position of the eye area detected by the eye detecting unit;
an image processing unit that performs, on the process image selected by the process image selecting unit, at least any one of trimming processing and transparency processing;
an image combining unit that combines the process image processed by the image processing unit with the original image in the combining position in the original image set by the combining position setting unit, and generates a composite image;
an image display unit that display the composite image; and
a composite image display control unit that performs control such that the composite image is displayed on the image display unit,
wherein the image processing unit further performs distortion processing by setting a predetermined position in the process image as a distortion center, and distorting the process image about the distortion center,
wherein the eye detecting unit determines an eye direction of the eye based on a result of detecting the eye area, and
wherein the image processing unit sets, in accordance with a pupil reference position determined from the eye direction of the eye determined by the eye detecting unit, the distortion center in the process image based on a relative position of the pupil reference position with respect to the eye area in the distortion processing.

2. An image pickup apparatus comprising:
an image pickup unit that picks up images to acquire picked-up images;
an original image selecting unit that selects, as an original image, a picked-up image of a subject including a face from the picked-up images acquired by the image pickup unit;
a process image selecting unit that selects, as a process image, a picked-up image to be combined with the original image from the picked-up images acquired by the image pickup unit;
an image combining instructing unit that issues an instruction to combine the process image with the original image;
an eye detecting unit that detects a face area from the original image, and detects an eye area of an eye based on a result of detecting the face area;
a combining position setting unit that sets a combining position, in which the process image selected by the process image selecting unit is to be combined as a catch light, in the original image based on a position of the eye area detected by the eye detecting unit;
an image processing unit that performs, on the process image selected by the process image selecting-unit, at least any one of distortion processing, reduction processing, trimming processing, brightness processing, adjustment processing, tone adjustment processing, and transparency processing;
an image combining unit that combines the process image processed by the image processing unit with the original image in the combining position in the original image set by the combining position setting unit, and generates a composite image;
an image display unit that display the composite image; and
a composite image display control unit that performs control such that the composite image is displayed on the image display unit,
wherein
the eye detecting unit determines a shape of the eye based on a result of detecting the eye area, and
the image processing unit sets a predetermined trimming position as a center, and trims the process image about the center based on the shape of the eye as the trimming processing.

3. The image pickup apparatus according to claim 2, wherein the image processing unit sets a center of the process image as the predetermined trimming position in the trimming processing.

4. The image pickup apparatus according to claim 2, wherein the eye detecting unit determines an eye direction of the eye based on the result of detecting the eye area, and the image processing unit sets, in accordance with a pupil reference position with respect to the eye direction of the eye determined by the eye detecting unit, the predetermined trimming position in the process image based on a relative position of the pupil reference position with respect to the eye area in the distortion processing.

5. An image pickup apparatus comprising:

an image pickup unit that picks up images to acquire picked-up images;

an original image selecting unit that selects, as an original image, a picked-up image of a subject including a face from the picked-up images acquired by the image pickup unit;

a process image selecting unit that selects, as a process image, a picked-up image to be combined with the original image from the picked-up images acquired by the image pickup unit;

an image combining instructing unit that issues an instruction to combine the process image with the original image;

an eye detecting unit that detects a face area from the original image, and detects an eye area of an eye based on a result of detecting the face area;

a combining position setting unit that sets a combining position, in which the process image selected by the process image selecting unit is to be combined as a catch light, in the original image based on a position of the eye area detected by the eye detecting unit;

an image processing unit that performs, on the process image selected by the process image selecting unit, at least any one of trimming processing and transparency processing;

an image combining unit that combines the process image processed by the image processing unit with the original image in the combining position in the original image set by the combining position setting unit, and generates a composite image;

an image display unit that display the composite image;

a composite image display control unit that performs control such that the composite image is displayed on the image display unit; and a picked-up image display control unit that performs control such that the picked-up images acquired by the image pickup unit are sequentially displayed on the display unit by changing display of the picked up images, wherein the original image selecting unit selects the original image by selecting a picked-up image of a subject including a face from the picked-up images that are sequentially displayed on the display unit, the process image selecting unit that selects the process image by selecting a picked-up image from the picked-up images that are sequentially displayed on the display unit, and the composite image display control unit performs control such that the composite image, the original image and the process image are displayed together with the composite image on the display unit.

6. The image pickup apparatus according to claim 5, wherein the composite image display control unit performs control such that the composite image is displayed in a size larger than those of the original image and the process image.

7. The image pickup apparatus according to claim 5, wherein, when the original image selecting unit selects the original image, the picked-up image display control unit performs control such that the picked-up images are sequentially displayed by changing the display of the picked-up images in a state where the original image selected by the original image selecting unit is displayed on the display unit.

8. The image pickup apparatus according to claim 7, wherein after the original image selecting unit selects the original image, the process image selecting unit selects a picked-up image newly displayed each time when the image display control unit changes the display of the picked-up images, and the image combining instructing unit issues the instruction to combine the process image with the original image each time when the process image selecting unit selects the process image.

9. The image pickup apparatus according to claim 7, wherein the picked-up image display control unit performs control such that, when performing control such that the picked-up images are sequentially displayed by changing the display of the picked-up images in the states where the original image selected by the original image selecting unit on the display unit, the picked-up images are displayed in a size larger than that of the original image.

* * * * *